United States Patent [19]

de Montmollin et al.

[11] 4,382,890
[45] May 10, 1983

[54] FIBER REACTIVE SULFO ARYL AZO N-SUBSTITUTED PYRIDONE-3-CARBOXAMIDE DYESTUFFS

[75] Inventors: Rene de Montmollin, Riehen; Dieter Mäusezahl, Biel-Benken, both of Switzerland

[73] Assignee: Ciba-Geigy Corporation, Ardsley, N.Y.

[21] Appl. No.: 114,761

[22] Filed: Jan. 23, 1980

Related U.S. Application Data

[63] Continuation of Ser. No. 856,152, Nov. 30, 1977, abandoned, which is a continuation of Ser. No. 704,897, Jul. 13, 1976, abandoned.

[30] Foreign Application Priority Data

Jul. 25, 1975 [CH] Switzerland ............... 9733/75
Jun. 14, 1976 [CH] Switzerland ............... 7520/76

[51] Int. Cl.³ ............... C09B 62/473; C09B 62/665; D06P 1/384; D06P 3/10
[52] U.S. Cl. ............................................. 260/156
[58] Field of Search ............ 260/153, 154, 156, 146 R

[56] References Cited

U.S. PATENT DOCUMENTS

| 3,725,303 | 4/1973 | Austin et al. | 260/156 X |
| 3,926,944 | 12/1975 | Berrie et al. | 360/156 X |
| 3,956,263 | 5/1976 | Buehler et al. | 260/156 X |
| 4,001,205 | 1/1977 | Buehler et al. | 260/156 |

*Primary Examiner*—Floyd D. Higel

*Attorney, Agent, or Firm*—Edward McC. Roberts

[57] ABSTRACT

Azo dye of the formula

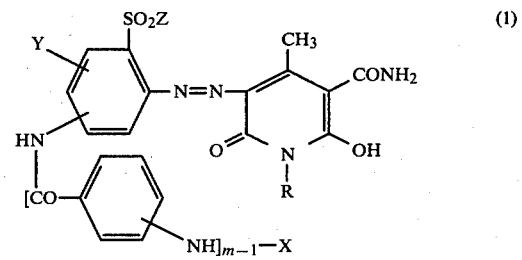

(1)

wherein

X represents an $\alpha,\beta$-dichloropropionyl or $\alpha,\beta$-dibromopropionyl group or an $\alpha$-chloroacryloyl or $\alpha$-bromoacryloyl group, Y represents hydrogen, chlorine, low molecular alkyl or alkoxy or a sulpho group, Z represents an OH group or a radical of the m-sulphobenzene series, R represents a substituted or unsubstituted alkyl radical of 1 to 8 carbon atoms, and m is 1 or 2, and wherein the group —NH—X is in meta- or para-position to the azo group. These dyes give strong, brilliant, and bright yellow dyeings on cotton, regenerated cellulose, and natural or synthetic polyamide materials, characterized by excellent light fastness and good wet fastness.

4 Claims, No Drawings

FIBER REACTIVE SULFO ARYL AZO N-SUBSTITUTED PYRIDONE-3-CARBOXAMIDE DYESTUFFS

This is a continuation of application Ser. No. 856,152 filed on Nov. 30, 1977, now abandoned, which is a continuation of application Ser. No. 704,897, filed July 13, 1976, (now abandoned).

The invention provides azo dyes of the formula

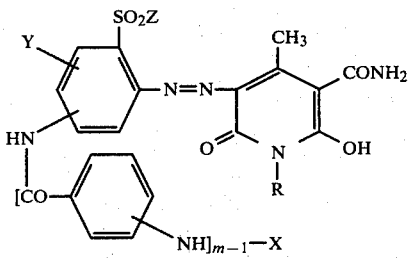

wherein
X represents an α,β-dichloropropionyl or α,β-dibromopropionyl group or an α-chloroacryloyl or α-bromoacryloyl group,
Y represents hydrogen, chlorine, low molecular alkyl or alkoxy or a sulph group,
Z represents an OH group or a radical of the m-sulphobenzene series,
R represents a substituted or unsubstituted alkyl radical of 1 to 8 carbon atoms, and
m is 1 or 2, and wherein the group —NH—X is in meta- or paraposition to the azo group.

The term low molecular denotes herein radicals which contain from 1 to 4 carbon atoms.

Preferred dyes are those wherein Z is an OH group or a 4-methyl-3-sulphophenyl radical, Y is preferably hydrogen or a sulpho group and X is in particular an α,β-dibromopropionyl group.

The radical R can be for example: methyl, ethyl, isopropyl, γ-methoxypropyl, γ-isopropoxypropyl, β-dimethylaminoethyl, β-hydroxyethyl, β-chloroethyl, n-butyl, isobutyl, pentyl, hexyl, β-ethylhexyl, n-octyl.

The dyes of the present invention are obtained, for example, by diazotising an amine of the formula

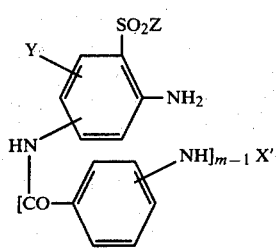

wherein X' represents an acyl group, and coupling the diazo component to a coupling component of the formula

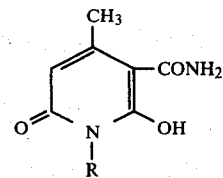

and, provided X' is not an α,β-dichloropropionyl or α,β-dibromopropionyl group or an α-chloroacryloyl or α-bromoacryloyl group, saponifying the acylamino group —NH—X' and subsequently introducing a radical of α,β-dichloropropionic or α,β-dibromopropionic acid or a radical of α-chloroacrylic or α-bromoacrylic acid by acylation. Suitable acylating agents are, for example, α,β-dichloropropionic or α,β-dibromopropionic halides.

Preferably diazo components of the formula (2) are used as starting compounds, wherein X' is an α,β-dichloropropionyl or α,β-dibromopropionyl group or an α-chloroacryloyl or α-bromoacryloyl group. However, it is also possible to use diazo components which contain a non-reactive acylamino group, for example an acetylamino group. These groups are then saponified and the liberated amino group is reacted with an acylating agent which yields the radical X.

The dyes with haloacryloyl groups are obtained by a modification of the process preferably from the corresponding dihalopropionyl compounds by treating these latter with dehydrohalogenating agents. The dehydrohalogenation is effected by known methods, for example by treatment with an alkali, such as sodium or potassium hydroxide, preferably at low temperature.

The dyes of this invention are suitable for dyeing and printing materials of the most widely different kind, such as cotton and regenerated cellulose fibres, but especially natural or synthetic polyamide materials, such as silk, wool and synthetic polyamides, for example nylon. Strong, brilliant, and bright yellow dyeings are obtained, which are characterised by excellent lightfastness while also possessing at the same time good wetfastness properties (for example fastness to water, perspiration, washing, fulling and decatising).

The following Examples will serve to illustrate the invention without restriction to what is described therein.

EXAMPLE 1

11.6 g (0.02 mole) of 1-amino-2-sulpho-5-α,β-dibromopropionylaminobenzene are suspended wet in 100 ml of water at room temperature. To this suspension are added 3 g of potassium bromide, then the mixture is acidified with 5 ml of 10 normal hydrochloric acid and 40 ml of 1 normal sodium nitrate solution are added dropwise. When the diazotisation is complete, a small excess of nitrite is destroyed with sulphamic acid. Then 5.75 g (0.02 mole) of 1-ethyl-4-methyl-6-oxy-2-pyridone-3-carboxamide are dissolved wet in 100 ml of water with 4 ml of 10 normal sodium hydroxide solution with heating and the batch is cooled to room temperature. The solution of the coupling component is slowly poured with stirring into the solution of the diazo component. The resultant solution is adjusted to pH 6 with 2 normal sodium hydroxide solution, and the dye is precipitated by adding sodium chloride, collected by filtration and dried in vacuo at 50° C. The dye colours nylon or wool in a bright, greenish-yellow shade of excellent lightfastness.

Yellow dyes of equally excellent lightfastness are obtained by using in this Example an equivalent amount of 1-amino-2-sulpho-5-α,β-dichloropropionylaminobenzene or 1-amino-2,6-disulpho-4-α,β-dibromopropionylaminobenzene instead of 1-amino-2-sulpho-5-α,β-dibromopropionylaminobenzene. Further yellow dyes with similar properties are obtained by reacting the diazo components listed in column 1 of the following table with the coupling components listed in column 2.

| 1 | 2 |
|---|---|
| ![structure] HN-C6H3(SO3H)-NH2 with CO-OCH3, BrCH—CH2Br | ![structure] pyridone with CH3, CONH2, HO, N-C2H5 |
| HN-C6H3(SO3H)-NH2 with CO-OCH3, Br—CH—CH2Br | pyridone with CH3, CONH2, HO, N-C2H5 |
| HN-C6H2(SO3H)(CH3)-NH2 with CO, Br—C=CH2 | pyridone with CH3, CONH2, HO, N-CH(CH3)2 |
| H3C-C6H2(SO3H)-NH2, HN-CO-CHBr-CH2Br | pyridone with CH3, CONH2, HO, N-CH(CH3)2 |
| C6H3(SO3H)-NH2, HN-CO-C6H4-NH-CO-CHBr-CH2Br | pyridone with CH3, CONH2, HO, N-C2H5 |
| OC-HN-C6H3(SO3H)-NH2, HN-CO-CBr=CH2 (with phenyl) | pyridone with CH3, CONH2, HO, N-CH2-CH(C2H5)-(CH2)3-CH3 |

-continued

| 1 | 2 |
|---|---|
| HO3S-C6H2(SO3H)-NH2, HN-CO-CHBr-CH2Br | pyridone with CH3, CONH2, HO, N-C2H5 |

EXAMPLE 2

40 g (0.02 mole) of a paste of 2-amino-4-chloro-5-α,β-dibromopropionylamino-4′-methyl-3′-sulpho-1,1′-diphenylsulphone are suspended in 500 ml of water. To the suspension are added 15 ml of 4 normal α-naphthalenesulphonic acid solution and 5 ml of 4 normal sodium nitrite solution are added dropwise at 30° C. When the diazotisation is complete, 5.8 g (0.02 mole) of 1-ethyl-4-methyl-6-oxy-β-pyridone-3-carboxamide are sprinkled in wet and a pH of 4 to 5 is kept by addition of 5.5 g of NaHCO3. Thereafter the reaction mixture is adjusted to pH 12 at 10° C. with sodium hydroxide solution to split off hydrogen bromide, kept for 30 minutes at pH 12, and then adjusted with hydrochloric acid to pH 7. The α-bromoacryloyl dye which has formed is precipitated by adding potassium chloride, collected by filtration and dried at 50° C. in vacuo. The dye colours nylon and wool in strong yellow shades.

A dye with similar properties is obtained by using in this Example a corresponding amount of 2-amino-5-α,β-dibromopropionylamino-4′-methyl-3′-sulpho-1,1′-diphenylsulphone instead of 2-amino-4-chloro-5-α,β-dibromopropionylamino-4′-methyl-3′-sulpho-1,1′-diphenylsulphone.

EXAMPLE 3

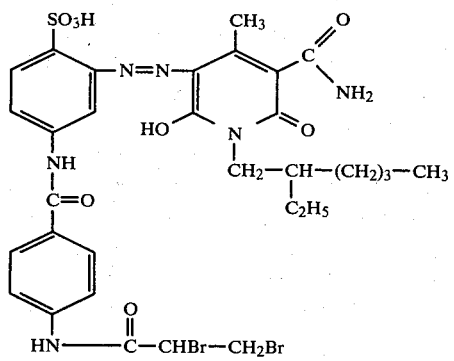

7.1 g (0.01 mole) of salt-containing 1-amino-2-sulpho-5-(4′-dibromopropionylaminobenzoyl)-benzene are suspended at 25° C. in 20 ml of water. The suspension is adjusted to pH 8 and homogenised with 10 ml (0.01 mole) of 1 normal sodium nitrite solution and 0.5 g of potassium bromide. The suspension is treated with 3 ml (0.03 mole) of 10 normal hydrochloric acid and diazotised at room temperature. The diazotisation is complete after 30 minutes. 29,1 ml (0.01 mole) of an alcoholic solution of 1-β-ethylhexyl-4-methyl-6-oxy-2-pyridone-3-carboxamide are poured slowly with stirring into the acid diazo suspension. After one hour the reaction mixture is adjusted with sodium acetate to pH 4.5.

The dye precipitates initially in oily form and becomes crystalline upon addition of sodium chloride. It is collected by filtration and dried in vacuo at 50° C.

The dye colours synthetic polyamide in a brilliant, deep yellow shade of good general fastness properties.

DYEING PROCEDURE I

The following ingredients are dissolved in succession in 4000 parts of water of 50° C.: 4 parts of 80% acetic acid, 2 parts of the ammonium salt of the acid sulphuric acid ester of the adduct of a fatty amine (consisting of 30% of hexadecylamine, 25% of octadecylamine and 45% of octadecenylamine) and 7 moles of ethylene oxide, and 4 parts of ammonium sulphate. 8 parts of the dye obtained in Example 1 are dissolved hot in 100 parts of water and added to this dyebath. Then 100 parts of prewetted wool knitting yarn are put into the bath and the bath temperature is raised from 50° to 80° C. in the course of 30 minutes. After dyeing for 20 minutes at 80° C., the bath is heated to the boil and dyeing is subsequently carried out at the boil for 90 minutes. The dye exhausts almost completely onto the substrate. After the bath has been cooled to 80° C., the pH is raised from app. 4.5 to a constant 8.5 by adding ammonia solution and the goods are given an aftertreatment for 20 minutes at this temperature. After a through rinsing with hot and cold water, acidifying with 1 part of 80% formic acid, centrifuging and drying, a deep yellow woollen yarn of very good fastness to wet treatments and rubbing and excellent lightfastness is obtained.

DYEING PROCEDURE II

A dyebath is prepared from 4000 parts of water, 4 parts of ammonium acetate, 2 parts of the dye of Example 3 and acetic acid in an amount sufficient to impart to the bath a pH of 4.5. Into this dyebath are put 100 parts of a synthetic polyamide jersey material. The bath is heated to the boil in the course of half an hour and dyeing is effected for 45 minutes at 100° C. A deep yellow dyeing of good lightfastness properties is obtained.

We claim:
1. An azo dye of the formula

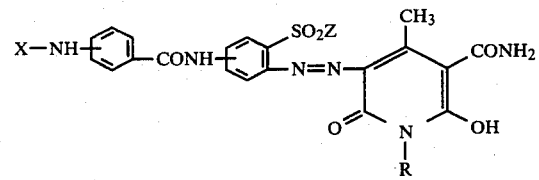

wherein
X is $\alpha,\beta$-dichloropropionyl, $\alpha,\beta$-dibromopropionyl, $\alpha$-chloroacryloyl or $\alpha$-bromoacryloyl group;
Z is OH or 4-methyl-3-sulfophenyl; and
R is alkyl of 1 to 8 carbon atoms which is unsubstituted or substituted by methoxy, isopropoxy, dimethylamino, hydroxy or chloro;
and wherein the —CONH— group is meta or para to the azo group.

2. An azo dye of claim 1, wherein Z is H.

3. An azo dye of claim 1, wherein X is $\alpha,\beta$-dibromopropionyl.

4. The dye of the formula

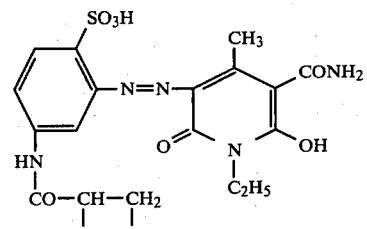

* * * * *